(12) United States Patent
Jengasevs

(10) Patent No.: US 10,112,266 B2
(45) Date of Patent: Oct. 30, 2018

(54) PRESSED THERMITE ROD FOR A SELF-CONTAINED PORTABLE CUTTING DEVICE

(71) Applicant: Baltic Innovation Holding PRO, AS, Riga (LV)

(72) Inventor: Igors Jengasevs, Riga (LV)

(73) Assignee: Baltic Innovation Holding PRO, AS, Riga (LV)

( * ) Notice: Subject to any disclaimer, the term of this patent is extended or adjusted under 35 U.S.C. 154(b) by 90 days.

(21) Appl. No.: 15/261,785

(22) Filed: Sep. 9, 2016

(65) Prior Publication Data

US 2018/0071871 A1   Mar. 15, 2018

(51) Int. Cl.
*B23K 7/00* (2006.01)
*B23K 35/02* (2006.01)
*B23K 35/22* (2006.01)

(52) U.S. Cl.
CPC ............ *B23K 35/0216* (2013.01); *B23K 7/00* (2013.01); *B23K 35/02* (2013.01); *B23K 35/228* (2013.01)

(58) Field of Classification Search
CPC .............................. B23K 35/0216; B23K 7/00
See application file for complete search history.

(56) References Cited

U.S. PATENT DOCUMENTS

| 4,544,139 A | * | 10/1985 | Moore | ...................... E21B 7/15 |
| | | | | 219/69.1 |
| 5,086,720 A | * | 2/1992 | Gibran | ...................... F23B 7/00 |
| | | | | 110/234 |
| 2018/0071871 A1 | * | 3/2018 | Jengasevs | .......... B23K 35/0216 |

FOREIGN PATENT DOCUMENTS

| LV | 15122 A | 5/2016 |
| RU | 2206437 C1 | 6/2003 |

* cited by examiner

*Primary Examiner* — Scott R Kastler
(74) *Attorney, Agent, or Firm* — Smartpat PLC

(57) ABSTRACT

A pressed thermite rod for a self-contained portable cutting device is disclosed having a longitudinal section of a rectangle shape and a cross-section of an elongated shape on its entire length with a height to width ratio ranging from 1.2 to 2.0 and with long sides parallel at least in their middle section. The cross-section of the pressed thermite rod may be close to rectangular. In other embodiments, the pressed thermite rod has a rectangular cross-section with rounded corners; convex rounded short sides; or rounded corners at a first short side and a convex rounded second short side.

20 Claims, 3 Drawing Sheets

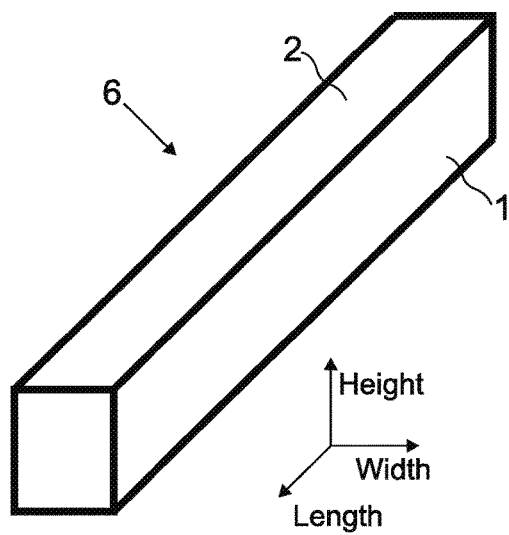
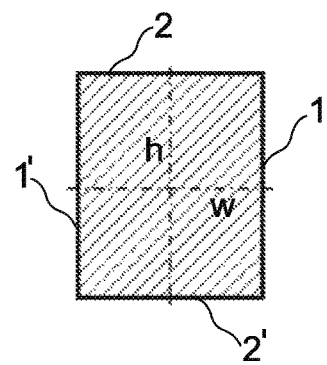
FIG. 1A
FIG. 1B
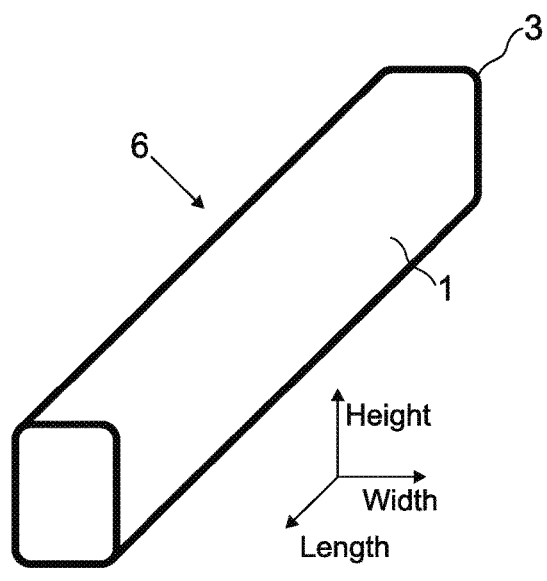
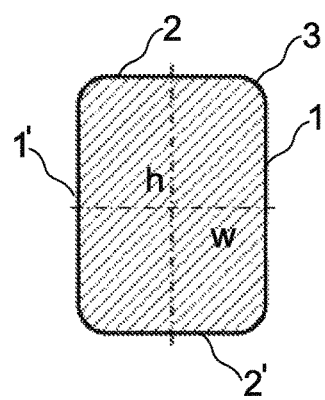
FIG. 2A
FIG. 2B

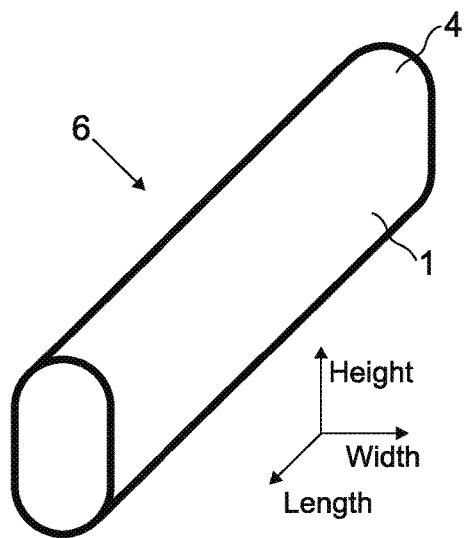
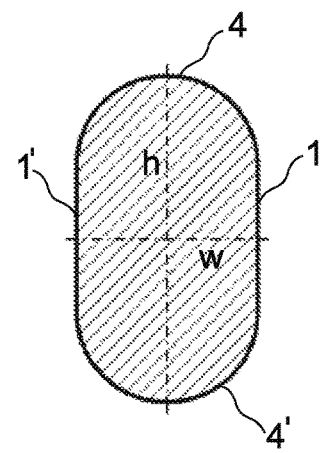
FIG. 3A  FIG. 3B
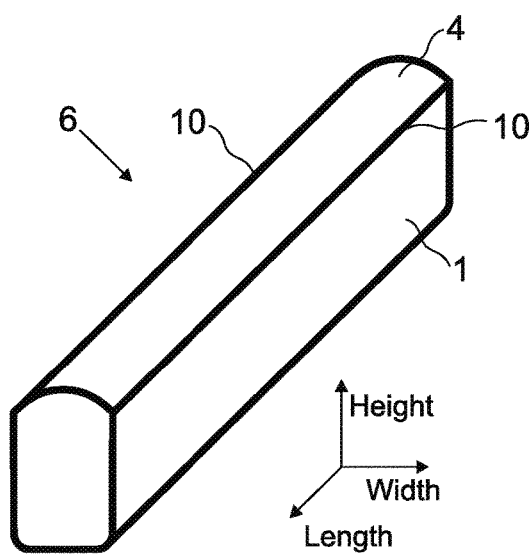
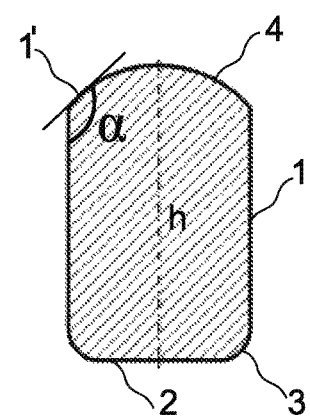
FIG. 4A  FIG. 4B

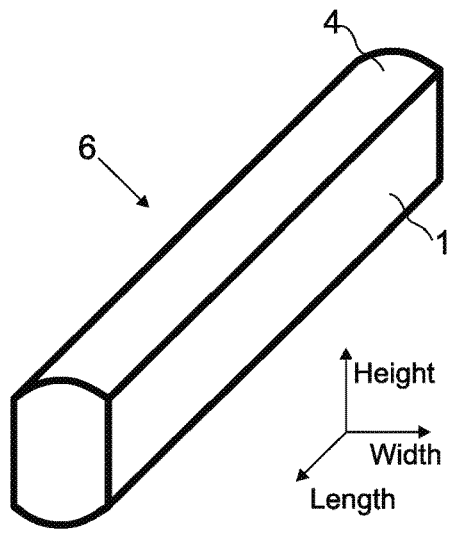
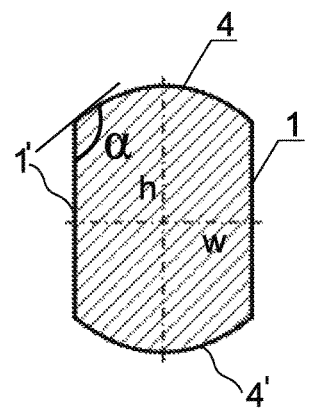
FIG. 5A  FIG. 5B
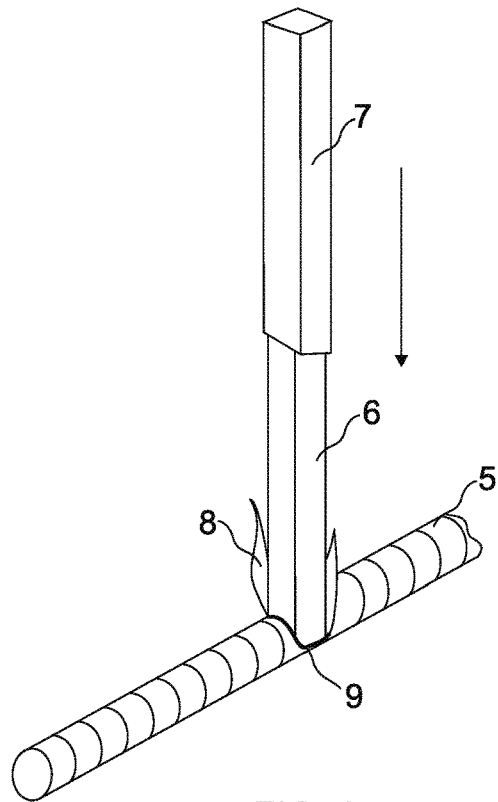
FIG. 6

PRESSED THERMITE ROD FOR A SELF-CONTAINED PORTABLE CUTTING DEVICE

TECHNICAL FIELD

The invention relates to a pressed rod made from a thermite composition, which is part of a portable cutting device usable for self-contained cutting of components and products made of steel, non-ferrous metals, glass, composite materials and other hard materials. Such non-explosive cutting devices may be used for rescue and maintenance works, in urban and remote locations, in particular in absence of power sources.

BACKGROUND

Non-explosive portable cutting devices usable for self-contained cutting of components and products made of metals and other hard materials are known in which a thermite composition is used. When such a cutting device is used, the thermite composition is ignited and burns at a high-temperature, creating a flame that is suitable for cutting.

A simple self-contained welding and cutting device (so called "welding pencil") is described in Russian patent No. 2206437 (Berezhnoj, et al., 2003). This device includes a thin-wall tube having a thermite mixture in the form of a cylindrical pressed rod with an envelope of a combustible film material at one end. A plug closes the other end of the tube. Depending upon composition of the rod it is possible to perform welding, surfacing and cutting of metal.

A similar device—thermite composition pencil characterised by the use of a specific thermite composition in the form of a cylindrical molded rod, is described in Latvian patent No. 15122 (Berezhnoy, et al., 2016). One of the embodiments of the thermite composition pencil is provided with a connecting yoke adapted to assemble two or more pencils in a package having an enlarged energy output during burning of the thermite composition.

However, in the known self-contained cutting devices comprising a cylindrical pressed thermite composition rod or two or more such cylindrical rods the energy released from burning of the thermite composition is not used effectively enough for cutting of components. The sides of the components cut by the known cylindrical pressed thermite composition rod are not flat and parallel.

SUMMARY

The technical problem to be solved by the present invention is to increase the efficiency with which energy released during burning of a thermite composition is used for cutting components, as well as to improving cutting quality.

A pressed thermite rod having a longitudinal section of a rectangle shape and intended for use in a self-contained portable cutting device, according to the present invention, on its entire length, has a cross-section of an elongated shape with a height to width ratio ranging from 1.2 to 2.0 and with long sides parallel at least in their middle portion. Such shape of the cross-section of a pressed thermite rod creates also a corresponding form of the flame during burning of the thermite composition so providing powerful, narrow directed heating of a product being cut. The efficiency of using the released energy increases and also the cutting quality of the components improves because the shape of the thermite rod and the corresponding form of the flame give a possibility of a more accurate and complete warming up of the cutting zone. It reduces heat losses, improves removing slag and molten metal from the cutting zone, as well as reduces the likelihood of loss of contact during the use. The sides of the cut component are more flat and parallel.

If the height to width ratio of the cross-section of the pressed thermite rod is less than 1.2, the effect of the deviation from the circular shape and the positive impact of parallel long sides does not appear. If the height to width ratio of the cross-section of the pressed thermite rod is more than 2.0, the strength characteristics of the pressed thermite rod significantly deteriorate.

A pressed thermite rod may have a cross-section close to rectangular. This cross-section is favorable for ensuring the quality and uniformity of a cut, however, technological problems may arise in manufacturing the pressed thermite rod, for example, chipping of the portions of the rod forming right angles may occur.

Said technological problem can be prevented if the pressed thermite rod has a rectangular cross-section with rounded corners.

Another technologically advantageous embodiments is a pressed thermite rod, which has a cross-section with at least one convex rounded short side or a cross-section with both convex rounded short sides. The term "convex rounded side" means a semicircle (an arc of a semicircle), a circular arc, or a combination of circular arcs. The pressed thermite rod may also have a cross-section with rounded corners at one short side and a convex rounded second short side. The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

The invention will be better understood with the following description, by way of explanation of embodiments of the invention with reference to the accompanying drawings which illustrate exemplary pressed thermite rods for a self-contained portable cutting device:

FIG. 1A shows a front isometric view and FIG. 1B shows a cross-sectional view of a pressed thermite rod with a rectangular cross-section.

FIG. 2A shows a front isometric view and FIG. 2B shows a cross-sectional view of a pressed thermite rod with a rectangular cross-section with rounded corners.

FIG. 3A shows a front isometric view and FIG. 3B shows a cross-sectional view of a pressed thermite rod having a cross-section with convex rounded (in the form of semi-circles) short sides.

FIG. 4A shows a front isometric view and FIG. 4B shows a cross-sectional view of a pressed thermite rod with a cross-section with rounded corners at one short side and a convex rounded second short side.

FIG. 5A shows s a front isometric view and FIG. 5B shows a cross-sectional view of a thermite rod having a cross-section with convex rounded short sides (in the form of a circular arc less than a semicircle).

FIG. 6 illustrates schematically the preferred embodiment of the pressed thermite rod with convex rounded short sides in use.

DETAILED DESCRIPTION

FIG. 1A shows a front isometric view and FIG. 1B shows a cross-section of a first exemplary embodiment of a pressed thermite rod 6. As shown, the pressed thermite rod 6 has a rectangular cross-section on its entire length. The pressed thermite rod 6 comprises two parallel long side surfaces 1,1' and two parallel short side surface 2, 2'. The two parallel long side surfaces 1,1' are arranged perpendicular to the two parallel short surfaces 2, 2'. The height to width ratio of the cross-section of the pressed thermite rod in this embodiment is equal to the ratio of the length (height) of the long side 1 to the length (width) of the short side 2 may range from 1.2 to 2.0 (in FIG. 1 it is 1.2).

FIG. 2A shows a front isometric view and FIG. 2B shows a cross-section of a second exemplary embodiment of the pressed thermite rod having a rectangular cross-section with rounded corners 3 on its entire length. The height to width ratio of the cross-section of the pressed thermite rod may range from 1.2 to 2.0 (in FIGS. 2A and 2B it is 1.4).

FIG. 3A shows a front isometric view and FIG. 3B shows a cross-section of a third exemplary embodiment of the pressed thermite rod with a cross-section with convex rounded (in the form of semicircles) short sides 4 along the entire length of the rod 6. The height (h) to width (w) ratio calculated for the maximum height and width of the cross-section may range from 1.2 to 2.0 (in FIGS. 3A and 3B it is 1.8). The long side surfaces 1,1' are parallel in their middle section. The two short side surfaces 4,4' have a semi-cylindrical shape and converge with the adjacent parallel long side surfaces 1,1' without forming an edge.

FIG. 4A shows a front isometric view and FIG. 4B shows a cross-section of a fourth exemplary embodiment of the pressed thermite rod with a cross-section section with rounded corners 3 at one short side 2 and a convex rounded second short side 4. The height to width ratio calculated for the maximum of the height and the width of the cross-section may range from 1.2 to 2.0 (in FIGS. 4A and 4B it is 1.6). The long sides 1 are parallel in their middle portion.

A preferred fifth embodiment of the pressed thermite rod for a self-contained portable cutting device is shows in FIGS. 5A and 5B. The preferred embodiment comprises two parallel flat long side surfaces 1,1' and two outwardly convex short side surfaces 4,4'. Inc long side surfaces 1,1' and the adjacent short side surfaces 4,4' converge at an angle of more than 90 degrees, forming dull edges 10 along the elongated pressed thermite rod. As shown in FIG. 5B the edge angle where the long side surface 1 and the short side surface 4' meet may be 125°. The height to width ratio at the thermite rod, based on the maximum height and width, is between 1.2 and 2.0. As shown it FIG. 5B the height to width ratio may be 1.5. In the cross-sectional view of FIG. 5B the outwardly convex rounded short side surfaces 4,4' have the form of a circular arc, extending less than a semicircle. The long side surfaces 1,1' are arranged parallel in their center section.

The rod 6 is made by pressing a thermite composition which has a flame temperature high enough to cut products made of steel, non-ferrous metals, glass, composite materials and other hard materials. An example of such a thermite composition comprises:

aluminum between about 25 and 27 percent by weight;
nickel (II) oxide between about 2 and 3 percent by weight;
sodium tetraborate between about 0.5 and 1 percent by weight; and
iron (III) oxide making the rest.

A binder—a PVA (polyvinyl alcohol) 8-10 wt % aqueous solution with addition of 4.3 wt % of glycerine is added to the composition listed above and the composition is pressed in the described shape. The pressed thermite rod is compact and has the strength characteristics sufficient for its transportation and some mechanical load when it is used for cutting.

In an exemplary use-case as illustrated in FIG. 6 the pressed thermite rod having the shape shown in FIGS. 5A and 5B is used for cutting an armature bar 5 made of steel A284Gr.D having a diameter of 20 mm. The pressed thermite rod 6 has a length of 170 mm, a cross-section with a height of 21 mm and a width of 14 mm (height to width ratio 1.5). The mass of the pressed thermite rod is 130 grams (±1 g.).

The pressed thermite rod is fastened in a holder 7. The shape and the kind (disposable or reusable) of the holder 7 may vary. The rod 6 is ignited at its distal end. Ignition is uniform. The shape of the flame 8 corresponds to the shape of the cross-section of the pressed thermite rod 6. The steel bar 5 is cut downward by pressing the burning thermite rod 6 so that the long sides 1,1' of its cross-section are perpendicular to the longitudinal axis of the bar 5 (similar if the bar would be pricked by a knife). The burning time of the pressed thermite rod is 18 seconds. The armature steel bar 5 is completely cut; both sides of the cut are rather flat and parallel. Almost all energy released from the burning of thermite composition is used for cutting of steel because practically only the cutting zone 9 is warmed up, the heat losses are minimized and a thermal contact during the use of the thermite rod is ensured.

To compare the preferred embodiment of the pressed thermite rod according to the present invention with the prior art, cylindrical rods (with round cross-section) are pressed from the same thermite composition. The cylindrical pressed thermite rod has a length of 170 mm, a diameter of 14 mm and a mass of 79 grams (±1 g.). The cylindrical pressed thermite rod is fastened in a holder and is ignited. A steel bar with a diameter of 20 mm is cut downward by pressing the burning thermite rod. The burning time is 18 seconds. The steel bar is cut incompletely, with a cutting depth of 8 mm. Both sides of the cut are not flat. Hanging metal and slag build-ups are being formed in the cutting zone. If the second cylindrical pressed thermite rod is fastened in a holder and ignited, the steel bar is still not cut completely, with a cutting depth of about 16 mm. If the third cylindrical pressed thermite rod is fastened in a holder and ignited, the steel bar is completely cut during 7-9 second (when a half of the third thermite rod is burned). However, the use of three pressed thermite rods is inconvenient and also the efficiency of using the energy released from the burning of the thermite composition is not enough high.

For another comparison two mentioned cylindrical pressed thermite rods are fastened in holders and assembled using a connecting clip into a package. The both rods are ignited. Ignition is uniform but not fully simultaneous. The steel bar is cut downward by pressing the burning thermite rods so that the line drown between the central axis of the rods is perpendicular to the longitudinal axis of the bar. Loss of the thermal contact during the use of the burning thermite rods is not fully prevented. The burning time is 19 seconds. The steel bar is cut incompletely, with a cutting depth of 16 mm.

Comparing the cutting results, it is clearly seen that the use of pressed thermite rod of the present invention in a self-contained portable cutting device increases the efficiency of using the energy released from the burning of the thermite composition for cutting as well as provides for improving of cutting quality.

What is claimed is:

1. A self-contained portable cutting device, comprising:
an elongated pressed thermite rod having a length, a height, and a width, the elongated pressed thermite rod extending from a proximal end to a distal end along a longitudinal axis;
two parallel long side surfaces; and
two short side surfaces,
wherein the rod has a height to width ratio between 1.2 and 2.0.

2. The cutting device as in claim 1, wherein the elongated pressed thermite rod has a rectangular cross-section.

3. The cutting device as in claim 2, wherein the cross-section of the elongated pressed thermite rod has rounded corners.

4. The cutting device as in claim 1, wherein at least one of the two short side surfaces is outwardly convex.

5. The cutting device as in claim 1, wherein the two short side surfaces are outwardly convex.

6. The cutting device as in claim 1, wherein one of the two short side surfaces is outwardly convex and the other of the two short side surfaces is arranged perpendicular to the two parallel long side surfaces.

7. The cutting device as in claim 1, wherein the two short side surfaces are parallel to each other and wherein the two parallel long side surfaces are arranged perpendicular to the two short surfaces.

8. The cutting device as in claim 1, wherein a long side surface and an adjacent short side surface converge at an angle of more than 90 degrees, forming a dull edge along the elongated pressed thermite rod.

9. The cutting device as in claim 1, wherein one of the two short side surfaces has an outwardly convex shape and converges with the adjacent long side surfaces at an angle of more than 90 degrees, forming two dull edges along the elongated pressed thermite rod.

10. The cutting device as in claim 1, wherein one of the two short side surfaces has semi-cylindrical shape and converges with the adjacent parallel long side surfaces without forming an edge.

11. The cutting device as in claim 1, wherein the thermite rod comprises:
between about 25 and 27 weight percent aluminum;
between about 2 and 3 weight percent nickel (II) oxide;
between about 0.5 and 1 weight percent sodium tetraborate; and
iron (III) oxide.

12. The cutting device as in claim 11, wherein the thermite rod further comprises a binder made of between about 8 and 10 weight percent of a polyvinyl alcohol aqueous solution with addition of about 4.3 weight percent of glycerine.

13. The cutting device as in claim 1, wherein the thermite rod has a burn time between 15 and 20 seconds.

14. The cutting device as in claim 1, further comprising a holder into which the proximal end of the thermite rod is inserted.

15. A pressed thermite rod for a self-contained portable cutting device, the rod having a length, a height, and a width, wherein the rod has a height to width ratio between 1.2 and 2.0.

16. The pressed thermite rod as in claim 15, wherein the rod has a rectangular cross-section.

17. The pressed thermite rod as in claim 15, wherein the rod has a generally rectangular cross-section with rounded corners.

18. The pressed thermite rod as in claim 15, wherein the rod has a cross-section with a convex rounded short side.

19. The pressed thermite rod as in claim 15, wherein the rod has a cross-section with two convex rounded short sides.

20. The pressed thermite rod as in claim 15, wherein the rod has two parallel long side surfaces, a first short side surface which extends perpendicular to the long side surfaces and is connected to the long side surfaces at rounded corners, and a second short side surface opposite the first short side surface having an outwardly convex shape.

* * * * *